3,378,844
SIGNAL PROCESSING
Lester A. Zurcher, Columbus, Ohio, assignor to North American Rockwell Corporation, a corporation of Delaware
Filed May 5, 1966, Ser. No. 547,968
2 Claims. (Cl. 343—16)

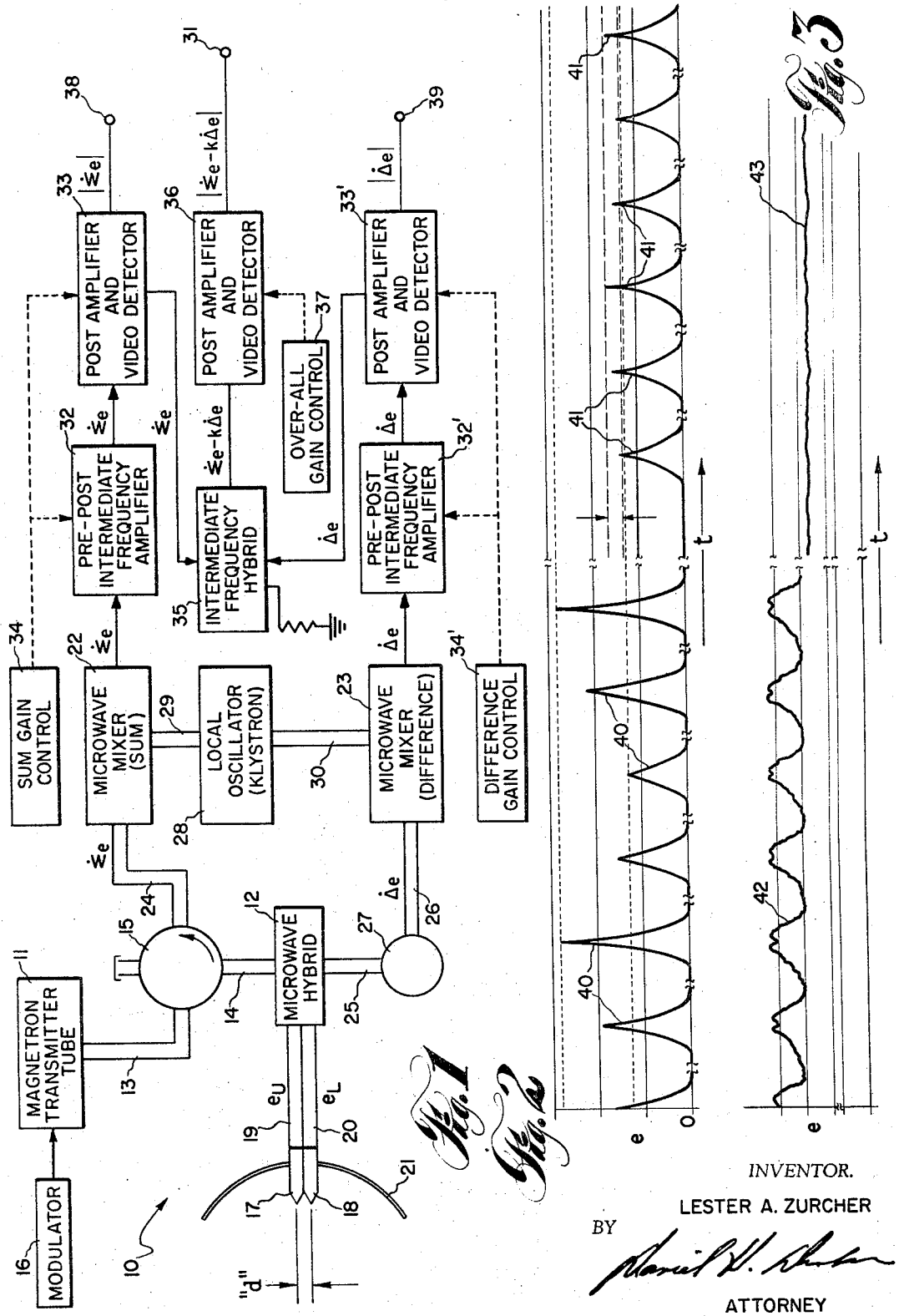

ABSTRACT OF THE DISCLOSURE

Unwanted clutter, multipath, and like reflection components are removed from a received electromagnetic energy signal also having direct transmission components by processing the received signal first simultaneously at elevationally-separated antenna means, then into respective phasor sum and phasor difference signals, and afterwards into an output which is the instantaneous phasor difference of said phasor sum and phasor difference signals and which is thereby substantially comprised only of the direct transmission components of the received signal. Signal processing into the instantaneous phasor difference output signal form is preferably accomplished by use of hybrid junction means.

---

The invention described and claimed herein is an improvement in processing received electromagnetic energy signals to remove unwanted reflection components otherwise contained therein. Received multiple electromagnetic energy signal beams are processed instantaneously and simultaneously in cooperating sum and difference channels and are combined in a novel manner to derive an output signal having the desired reflection-free characteristic. From a utility standpoint, the invention is important with respect to monopulse-type radar equipment, video data link systems, passive detector arrangements, and the like wherein intelligence-containing received signals may have unwanted components such as mirror reflections, for example.

In many electromagnetic energy signal applications, multiple directional signal beams have been processed to obtain maximum detection of contained or transmitted intelligence. In the case of conventional monopulse radar equipment, the received multiple beams may be utilized to detect and/or track targets of interest; in the case of video data links, and the like, the received multiple beams are processed to extract particular intelligence. In either event, the received signal, if transmitted from beyond reflection points or surfaces may contain reflection components that are responsible for associated signal instability. Such reflection components are sometimes referred to as multipaths and generally occur in an elevational sense as a result of strong reflection points or surfaces such as water. In some cases, the reflection components may be classified as clutter. The signal processing and signal processor techniques described herein have been utilized to successfully remove reflection components from received multiple beam microwave-type signal wherein undesired signal reflection components have been present to a significant degree.

One embodiment of the signal processor apparatus used in the practice of this invention is illustrated, largely in block diagram form, in FIG. 1 of the drawings. FIGS. 2 and 3, respectively, compare pulsed signals and continuous wave signals obtained through practice of this invention with generally similar signals obtained by conventional multiple beam signal processing techniques.

The transmit/receive monopulse radar equipment arrangement 10 of FIG. 1 has been utilized to practice the instant signal processing invention. In the arrangement a magnetron transmitter tube 11 is operated at a microwave frequency of 35 gc. and is coupled to microwave hybrid 12 through waveguide sections 13 and 14 and circulator 15 in a conventional manner. Transmitter tube 11 was controlled by modulator 16 to provide a pulsed output having individual pulses of approximately 40 nanoseconds pulse width; the pulse repetition frequency established by modulator 16 is approximately 2,050 pulses per second. In the transmit mode of operation, hybrid 12 is coupled to antenna elements 17 and 18 through separate waveguide sections 19 and 20, respectively, to radiate multiple electromagnetic energy beams. Antenna elements 17 and 18 are displaced elevationally, as designated by the dimension "$d$," and are effective to launch directional fields that are radiated from parabolic reflector 21 with a 3 db beam width of approximately 1.8°. In the receive mode of operation, hybrid 12 functions to provide particular input signals to microwave mixers 22 and 23. The signal provided by microwave hybrid 12 to mixer 22 is a conventional monopulse radar signal that essentially is the sum of the amplitudes of the signals received by antenna elements 17 and 18; such sum signal is conducted to mixer 22 from hybrid 12 by means of waveguide section 14, circulator 15, and the additional waveguide section 24 to microwave mixer 22. The input signal provided by hybrid 12 to microwave mixer 23 relates specifically to the instant invention and essentially is the difference of the signals received by antenna elements 17 and 18. The difference signal is normally conducted to mixer 23 from hybrid 12 through waveguide sections 25 and 26 and the intermediately positioned phase shifter 27. Phase shifter 27 functions to provide compensation for phase differences developed as a result of transmission dissimilarities in the different signal processing channels. Thus, the sum and difference signals derived at microwave hybrid 12 in the receive mode have an in-phase relationship when introduced simultaneously to mixers 22 and 23.

As in the case of a conventional monopulse radar system, a local oscillator 28 is provided in equipment arrangement 10 to establish a suitable intermediate frequency for optimum signal processing. In terms of FIG. 1 apparatus, such local oscillator takes the form of a klystron device coupled to mixer 22 through waveguide section 29. Local oscillator 28 is additionally coupled to microwave mixer 23 by means of waveguide section 30 to utilize the same intermediate frequency for the receiver difference channel.

Processing of the sum and difference signals beyond mixers 22 and 23 is, apart from those aspects of processing relating to this invention, controlled largely by the objective that is to be realized. In the case of the FIG. 1 arrangement, the overall signal processing objective is to place the received signal in suitable form for visual display. Accordingly, equipment arrangement 10 is provided with an output terminal 31 that is suited for connection to a cathode ray tube display device (not shown). Amplification, detection, and similar functions performed in the receiver prior to introducing the resulting signal to output terminal 31, accordingly, may be accomplished using conventional equipment components and design practices.

Each receiver signal channel (sum or difference) is provided with a pre-amplifier 32, 32' that receives and amplifies the signal from the microwave mixer associated therewith. The pre-amplifier is in turn coupled to a post-amplifier and detector 33, 33' that accomplishes additional amplification. A manual (or automatic) gain control 34, 34' is preferably provided in each of the signal channels for use for adjusting the amplifiers for matching purposes. Output terminals 38 and 39 may be used to obtain the absolute value signals detected at sum and difference channel amplifier-detectors 33, 33' respectively.

In the practice of this invention the amplified intermediate frequency phasor sum and phasor difference signals, after amplification by elements 33, 33' are combined at the hybrid designated 35. The desired output signal of hybrid 35 is the phasor difference between the phasor sum and phasor differtnce input signals and is essentially free of the signal reflection components received at antenna elements 17 and 18. Further amplification and such detection as is required for display presentation purposes may be accomplished by amplifier detector 36. Further gain control may be accomplished by means of the overall gain control designated 37.

The signal processing advantages that may be realized from the practice of this invention are readily discernible from a comparison of the visual displays developed from processed signals at output terminal 31 with conventional signals as taken from output terminal 38. Such displays are shown in FIGS. 2 and 3 in connection with pulsed signals and continuous wave signals, respectively.

In the case of FIG. 2, the signals designated as 40 are the heretofore described sum signals typically developed by means of the receiver sum channel only (terminal 38) in the manner of a conventional multiple beam monopulse radar set. As noted, the peak amplitude varies randomly with respect to time and essentially because of the presence of unwanted reflection components. Those pulses designated 41 in FIG. 2 are developed simultaneously from output terminal 31 and represent the phasor difference between the phasor sum signal developed in the sum channel and the phasor difference signal developed in the difference channel. As shown therein, the individual processed pulses have a comparatively near-equal amplitude over a substantial time period and are essentially free of any reflection component.

Similar characteristics may be developed with respect to continuous wave signals as shown by FIG. 3. However, in this instance, the transmission equipment arrangement was somewhat different than the arrangement disclosed in FIG. 1. More specifically, a separate transmitter was utilized to radiate a continuous wave signal at a continuous wave frequency of 34.83 gc. The radiated signal had a horizontal beam width of approximately 10° and a vertical beam width of approximately 8°. The equipment arrangement of FIG. 1, insofar as the receiver mode of operation is concerned, was utilized to process the received continuous wave signal and its included reflection components. The waveform designated 42 is a sum signal processed according to conventional techniques and taken at terminal 38. The waveform portion designated 43 is the same received signal but processed in accordance with the hereinbefore described method to develop an output signal at terminal 31 that is the phasor difference between phasor sum and difference signals thus essentially eliminating the reflection component.

The waveforms of FIGS. 2 and 3 are visual displays of processed signals actually obtained through practice of the instant invention using apparatus arrangements having the operating characteristics specifically described herein. In the case of the FIG. 2 illustration, the ordinate values for the visual display reference line spacings were approximately 0.63 volt per unit; the processed signals represented a two-way radar return from a corner reflector positioned approximately 1,000 feet from the receiving antennas and located approximately 200 feet beyond a strong ground-level reflecting point. In the case of the continuous wave signals, the display reference line (ordinate value) spacing is approximately 0.25 volt per unit.

It is to be understood that the forms of the invention herewith shown and described are to be taken as preferred embodiments of the same, but that various changes in the shape, size, number, and arrangement of parts may be resorted to without departing from the spirit of the invention or the scope of the subjoined claims.

I claim:

1. Apparatus for processing electromagnetic energy signals having unwanted reflection components to substantially remove such reflection components therefrom, comprising:
   (a) two antenna means which are elevationally displaced with respect to one another and which simultaneously receive an electromagnetic energy signal with a different unwanted reflection component,
   (b) signal processing means receiving each of the simultaneous signals received by said elevationally displaced antenna means and producing a first output signal that is the phasor sum of said simultaneously-received signals and producing a second output signal that is the phasor difference between said simultaneously-received signals, and
   (c) intermediate frequency hybrid means receiving each of said phasor sum and difference signals and producing a processed output signal that is the instantaneous phasor differences between said phasor sum signal and said phasor difference signal,
       said processed output signal being substantially free of the unwanted reflection components contained in the electromagnetic energy signals received by said antenna means.

2. A method for processing an electromagnetic energy signal to substantially remove unwanted reflection components associated therewith, comprising the steps of:
   (a) receiving said electromagnetic energy signal at a first position with an unwanted reflection component therein,
   (b) simultaneously receiving said electromagnetic signal at a second position that is elevationally displaced from said first position and with an unwanted reflection component therein of greater amplitude and different phase relation than the unwanted reflection component of the electromagnetic energy signal received at said first position,
   (c) combining said simultaneously-received signals to produce a first output signal that is the phasor sum thereof,
   (d) combining said simultaneously-received signals to produce a second output signal that is the phasor difference thereof, and
   (e) combining said phasor sum and difference output signals to produce a processed output signal that is the instantaneous phasor difference between said phasor sum signal and said phasor difference signal,
       said processed output signal being substantially free of said unwanted reflection components contained in the received electromagnetic energy signals.

References Cited

UNITED STATES PATENTS

| | | | |
|---|---|---|---|
| 3,078,453 | 2/1963 | McGillem et al. | 343—16 |
| 3,097,356 | 7/1963 | Ruisinger | 343—16 |
| 3,343,166 | 9/1967 | Poinsard | 343—16 |

RICHARD A. FARLEY, *Primary Examiner.*

RODNEY D. BENNETT, *Examiner.*

C. L. WHITHAM, *Assistant Examiner.*